US012232167B2

(12) United States Patent
Wang et al.

(10) Patent No.: US 12,232,167 B2
(45) Date of Patent: Feb. 18, 2025

(54) WIRELESS COMMUNICATION USING MULTIPLE TYPES OF RANDOM ACCESS OCCASIONS

(71) Applicant: QUALCOMM Incorporated, San Diego, CA (US)

(72) Inventors: Xiao Feng Wang, San Diego, CA (US); Iyab Issam Sakhnini, San Diego, CA (US); Dan Zhang, San Diego, CA (US); Huilin Xu, San Diego, CA (US); Peter Gaal, San Diego, CA (US); Jun Ma, San Diego, CA (US); Yiqing Cao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 326 days.

(21) Appl. No.: 17/753,621

(22) PCT Filed: Oct. 2, 2019

(86) PCT No.: PCT/CN2019/109796
§ 371 (c)(1),
(2) Date: Mar. 9, 2022

(87) PCT Pub. No.: WO2021/062860
PCT Pub. Date: Apr. 8, 2021

(65) Prior Publication Data
US 2022/0346138 A1    Oct. 27, 2022

(51) Int. Cl.
*H04W 74/00*       (2009.01)
*H04W 76/10*       (2018.01)
(52) U.S. Cl.
CPC ......... *H04W 74/006* (2013.01); *H04W 76/10* (2018.02)

(58) Field of Classification Search
CPC ............. H04W 74/006; H04W 74/008; H04W 74/004; H04W 74/002; H04W 76/10; H04W 76/00
See application file for complete search history.

(56) References Cited

U.S. PATENT DOCUMENTS

2013/0242730 A1    9/2013  Pelletier et al.
2019/0327766 A1*  10/2019  Zhang ................. H04W 74/006
(Continued)

FOREIGN PATENT DOCUMENTS

CA       3104064 A1 * 12/2019  ............ H04W 72/02
CN       106664265 A  *  5/2017  ............ G01S 13/00
(Continued)

OTHER PUBLICATIONS

International Search Report and Written Opinion—PCT/CN2019/109796—ISA/EPO—Jun. 30, 2020.
(Continued)

*Primary Examiner* — Phong La
(74) *Attorney, Agent, or Firm* — Patterson & Sheridan, LLP

(57) ABSTRACT

Certain aspects of the present disclosure provide techniques for supporting multiple types of random access occasions. A method that may be performed by a user equipment (UE) includes receiving, from a base station (BS), an indication of at least two types of random access occasions (ROs) including a first RO type and a second RO type for communicating in a first coverage area of the BS as part of a random access process for the UE to establish a connection with the BS in the first coverage area. The method further includes transmitting, to the BS, a preamble on an RO of one of the first RO type or the second RO type, wherein a preamble format of the preamble is based on whether the RO is of the first RO type or the second RO type.

22 Claims, 8 Drawing Sheets

(56) References Cited

U.S. PATENT DOCUMENTS

| | | | |
|---|---|---|---|
| 2020/0059957 A1* | 2/2020 | Pan | H04L 5/0094 |
| 2020/0077446 A1* | 3/2020 | Agiwal | H04W 16/14 |
| 2020/0288506 A1* | 9/2020 | Lei | H04W 74/0833 |
| 2020/0351801 A1* | 11/2020 | Jeon | H04W 52/48 |
| 2021/0014715 A1* | 1/2021 | Jung | H04W 36/0077 |
| 2021/0058971 A1* | 2/2021 | MolavianJazi | H04L 5/0044 |
| 2021/0084687 A1 | 3/2021 | Liu et al. | |
| 2021/0084688 A1* | 3/2021 | Ly | H04W 76/27 |
| 2022/0346138 A1* | 10/2022 | Wang | H04W 74/006 |
| 2023/0217504 A1* | 7/2023 | Xiong | H04W 74/0891 370/329 |

FOREIGN PATENT DOCUMENTS

| | | |
|---|---|---|
| CN | 110034887 A | 7/2019 |
| CN | 110167164 A | 8/2019 |
| WO | 2018064367 A1 | 4/2018 |
| WO | 2018234851 A1 | 12/2018 |
| WO | 2019074702 A1 | 4/2019 |
| WO | WO-2019141123 A1 * 7/2019 | H04W 68/02 |
| WO | WO-2020041089 A1 * 2/2020 | H04W 56/0005 |

OTHER PUBLICATIONS

Qualcomm Incorporated: "Initial Access and Mobility Procedures for NR Unlicensed", 3GPP Draft, 3GPP TSG RAN WG1 Meeting #97, R1-1907262 7.2.2.2.2 Initial Access and Mobility Procedures for NR-U, 3rd Generation Partnership Project (3GPP), Mobile Competence Centre, 650, Route Des Lucioles, F-06921 Sophia-Antipolis, vol. RAN WG1, No. Reno, US, May 13, 2019-May 17, 2019, May 13, 2019, XP051728702, pp. 1-16, Retrieved from the Internet: URL: http://www.3gpp.org/ftp/Meetings%5F3GPP%5FSYNC/RAN1/Docs/R1%2D1907262%2Ezip.

Dish Network., et al., "Satellite Aspects-Forward Compatibility Consideration for Random Access Preamble Format", 3GPP TSG RAN WG1 Meeting NR AH, R1-1700700, 3rd Generation Partnership Project (3GPP), Mobile Competence Centre, 650, Route Des Lucioles, F-06921 Sophia-Antipolis, Cedex, France vol. RAN WG1, No. Spokane, WA, Jan. 16, 2017-Jan. 20, 2017, Jan. 9, 2017, pp. 1-5, XP051202328, p. 4, Figure 3, Proposal 1, p. 4, p. 4, Line 1-4.

Supplementary European Search Report—EP19947963—Search Authority—The Hague—Mar. 24, 2023.

ZTE., et al., "Report of Email Discussion [106#70] [NR/NTN] RACH Capacity/procedures", 3GPP TSG-RAN WG2 Meeting #107, R2-1909256_Report of [106#70] [NRNTN] Rach Capacityprocedures-V1, 3rd Generation Partnership Project (3GPP), Mobile Competence Centre, 650, Route Des Lucioles, F-06921 Sophia-Antipolis CED, vol. RAN WG2, No. Prague, Czech, Aug. 26, 2019-Aug. 30, 2019, Aug. 15, 2019, pp. 1-38, XP051767060, p. 5, Figure 2, Solution 2, p. 8, Paragraph 3.2.1, p. 19, Line 3-6, p. 22, Paragraph 3.3, p. 25.

* cited by examiner

WIRELESS COMMUNICATION USING MULTIPLE TYPES OF RANDOM ACCESS OCCASIONS

BACKGROUND

Field of the Disclosure

Aspects of the present disclosure relate to wireless communications, and more particularly, to techniques for performing a random access process (e.g., a random access channel (RACH) process).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in wireless networks such as a non-terrestrial network (NTN) and terrestrial networks.

Certain aspects provide a method for wireless communication at a user equipment (UE). The method generally includes receiving, from a base station (BS), an indication of at least two types of random access occasions (ROs) including a first RO type and a second RO type for communicating in a first coverage area of the BS as part of a random access process for the UE to establish a connection with the BS in the first coverage area. The method further includes transmitting, to the BS, a preamble on an RO of one of the first RO type or the second RO type, wherein a preamble format of the preamble is based on whether the RO is of the first RO type or the second RO type.

Certain aspects provide a method for wireless communication at a base station (BS). The method generally includes transmitting an indication of at least two types of random access occasions (ROs) including a first RO type and a second RO type for communicating in a first coverage area of the BS as part of a random access process for one or more user equipments (UEs) to establish a connection with the BS in the first coverage area. The method further includes receiving, from a UE, a preamble on an RO of one of the first RO type or the second RO type, wherein a preamble format of the preamble is based on whether the RO is of the first RO type or the second RO type.

Certain aspects provide a user equipment (UE), comprising a memory and a processor communicatively coupled to the memory. In some examples, the processor is configured to receive, from a base station (BS), an indication of at least two types of random access occasions (ROs) including a first RO type and a second RO type for communicating in a first coverage area of the BS as part of a random access process for the UE to establish a connection with the BS in the first coverage area. The processor is further configured to transmit, to the BS, a preamble on an RO of one of the first RO type or the second RO type, wherein a preamble format of the preamble is based on whether the RO is of the first RO type or the second RO type.

Certain aspects provide a base station (BS), comprising a memory and a processor communicatively coupled to the memory. In some examples, the processor is configured to transmit an indication of at least two types of random access occasions (ROs) including a first RO type and a second RO type for communicating in a first coverage area of the BS as part of a random access process for one or more user equipments (UEs) to establish a connection with the BS in the first coverage area. The processor is further configured to receive, from a UE, a preamble on an RO of one of the first RO type or the second RO type, wherein a preamble format of the preamble is based on whether the RO is of the first RO type or the second RO type.

Aspects of the present disclosure provide means for, apparatus, processors, and computer-readable mediums (e.g., non-transitory) for performing the methods described herein.

Aspects of the present disclosure provide means for, apparatus, processors, and computer-readable mediums (e.g., non-transitory) for performing techniques and methods that may be complementary to the operations by the BS described herein, for example, by a satellite.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
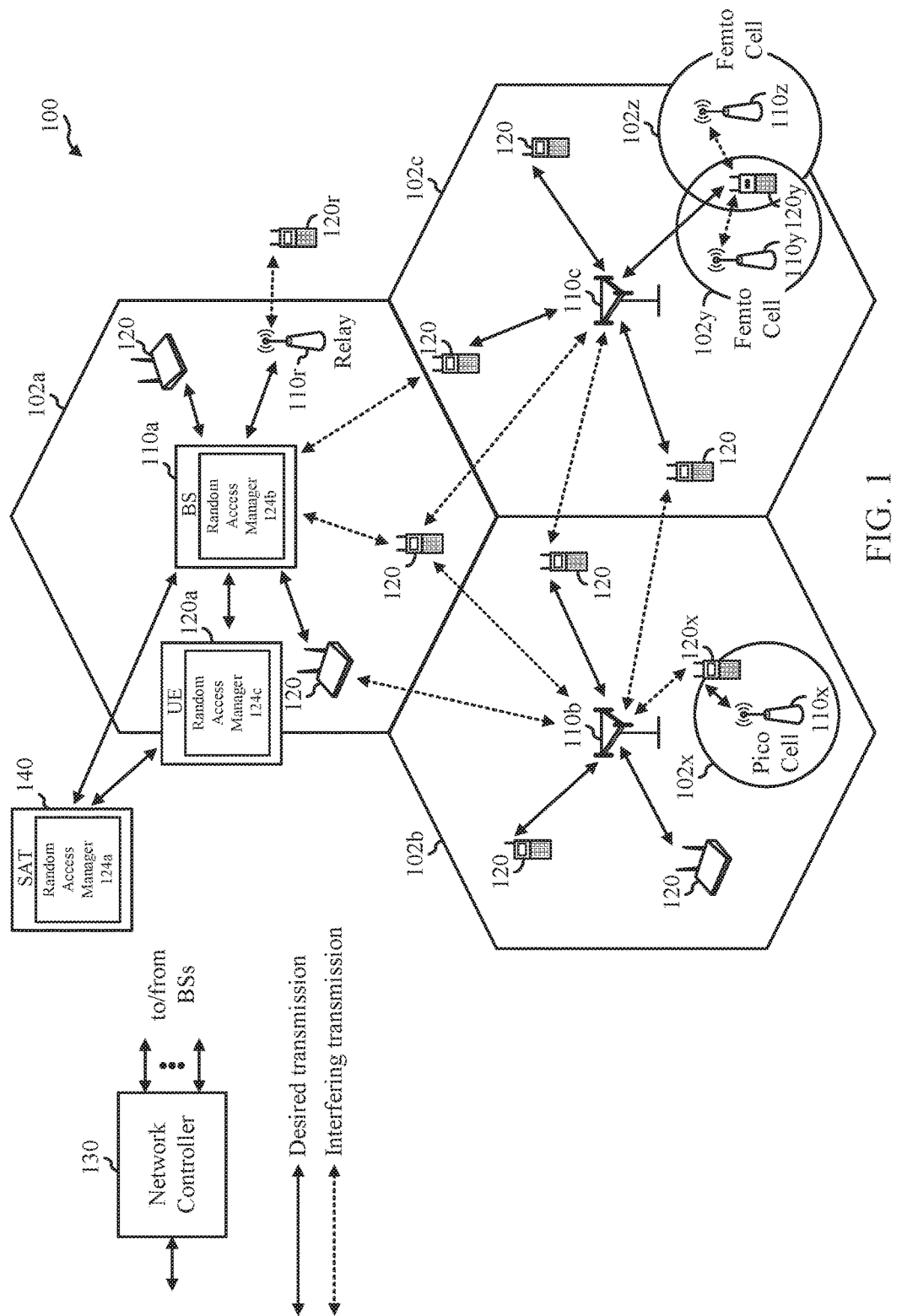
FIG. 1 is a diagram conceptually illustrating an example telecommunications network, in accordance with certain aspects of the present disclosure.

Aspects of the present disclosure provide apparatus, methods, processing systems, and computer readable mediums that support multiple types of random access occasions (ROs) (e.g., random access channel (RACH) occasions) for UEs to access BSs.

A UE may determine to connect to a BS in a coverage area (e.g., cell, beam transmitted by a satellite, etc.) it does not have an established connection for (e.g., a BS it is currently connected to in another coverage area, another BS, etc.) based on, for example, one or more of a variety of communication parameters, movement of the UE, the UE seeking initial access, the initiation of a handover procedure, etc. In order to initiate communication with the BS in the coverage area, the UE may transmit a random access channel (RACH) preamble to the BS to begin a random access process (e.g., RACH process) of connecting to the BS in the coverage area. In certain aspects, the preamble includes a cyclic prefix (CP) and a preamble sequence (e.g., including one or more sequences, such as Zadoff-Chu sequences, repeated one or more times). Different UEs may use different preambles (though collisions may occur), which in part act as signatures such that the BS can differentiate between transmissions from different UEs. The transmission of the preamble may occur in a physical random access channel (PRACH), and the preamble may be transmitted as part of a multiple step random access process. It should be noted that the term RACH and PRACH may at times be used interchangeably herein when appropriate. RACH refers to a transport-layer channel, and the corresponding physical-layer channel is PRACH.

The random access process of a UE connecting to a BS in a coverage area may include multiple steps. Initially, the BS, in the coverage area, transmits system information (e.g., for initial attachment of a UE) that the UE receives. The BS may periodically transmit such system information.

The system information includes configuration of RACH transmission parameters for the UE, such as an indication (e.g., index) of RACH preamble format and an indication of an RO type associated with the RACH preamble format for the UE to transmit the RACH preamble to the BS. The RACH preamble format indication may map to a RACH preamble format based on a mapping (e.g., table) stored at the UE. The RACH preamble format may indicate for example a sequence length (e.g., corresponding to a time duration) (e.g., of a Zadoff-Chu sequence used for the preamble), a subcarrier spacing (SCS), a cyclic prefix (CP) length (e.g., corresponding to a time duration), etc.

The indication of RO type may indicate a starting time and starting frequency location of one RO, and a periodicity at which ROs occur. For example, the UE may use the transmission time of the system information or another downlink signal from the BS to synchronize with timing of the BS and determine the starting time of the one RO with reference to the synchronized timing. Further, the UE may determine a length (e.g., duration) in time of each of the ROs and a width in frequency of each of the ROs based on the RACH preamble format associated with the RO type. Accordingly, based on the indication of RO type and associated RACH preamble format, the UE can determine the time and frequency resources of the ROs. For example, the UE is configured to transmit the preamble to the BS using one of the determined ROs, and according to the indicated RACH preamble format.

The system information may further include parameters for determining root sequences and their cyclic shifts in the preamble sequence set. The parameters may include one or more of an index to logical root sequence table, cyclic shift, and set type (e.g., unrestricted, restricted set A, restricted set B, etc.). For example, such parameters may be used by the UE to determine which root sequence(s) to use for the preamble sequence and cyclic shift(s) to apply to the root sequence(s).

Based on receiving the system information, the UE may transmit a preamble message (e.g., Msg1) to the BS including a preamble that is formatted based on the system information as discussed and using one of the determined ROs. The preamble message may include a random access radio network temporary identifier (RA-RNTI) associated with the UE.

The BS may transmit a preamble response (e.g., Msg2, random access response (RAR), RACH Response, etc.) based on the received preamble. For example, the BS transmits downlink control information (DCI) scrambled with the RA-RNTI associated with the UE. The DCI may include a resource allocation (e.g., time and frequency resources) for an uplink, such as an uplink grant, that the UE can then use to transmit to the BS in the cell on the uplink.

In another case, the preamble response may not indicate any resource allocation for the UE, and may indicate a backoff interval (BI). The BI may map to a period of time that the UE should refrain from again attempting a random access process to receive an uplink grant.

Based on receiving a preamble response indicating an uplink grant and having the RA-RNTI associated with the UE, the UE may transmit a radio resource control (RRC) connection request (e.g., Msg3) to the BS on the uplink in the resources indicated in the uplink grant. The BS may respond with an RRC connection setup message (e.g., Msg4). Accordingly, the UE establishes a connection with the BS in the cell. Each of these messages may be transmitted back and forth between the UE and the BS as discussed.

Communication between a BS and a UE may be subject to round-trip delay (RTD) (e.g., the time for the UE to transmit a communication to the BS and receive a response transmitted from the BS) and/or frequency shift (e.g., Doppler shift) due to factors such as the distance between the BS and UE, relative velocities between the BS and UE, and communication medium (e.g., air, atmosphere, etc.) between the BS and UE. The BS and UE may need to accommodate for such RTD and/or frequency shift when communicating between one another as communication in the network is synchronized. In particular, each of the BS and UE, based on communication being synchronized, expect to receive particular transmissions at particular times and frequencies. Therefore, the device transmitting to the BS or UE may need to adjust the time (e.g., according to half of the RTD) and frequency at which it transmits in order to account for RTD and frequency shift and ensure that the transmission arrives at the BS or UE at the expected time and frequency.

In certain aspects, the BS is configured to utilize the preamble received from the UE as part of a random access process to estimate the RTD and/or frequency shift between the BS and the UE. For example, the BS determines the RTD and/or frequency shift based on a difference between the time and/or frequency at which the preamble is received from the UE and the starting time and location of the RO in which the preamble is received. The BS may further indicate time and/or frequency offsets (e.g., timing advance) that the UE should then utilize when transmitting to the BS in the preamble response.

In certain aspects, the length (e.g., time duration) of the CP of the preamble transmitted by the UE should be long enough that it can accommodate for the RTD between the UE and the BS, meaning it is long enough for the BS to estimate RTD between the UE and the BS. In particular, the larger the RTD the longer CP required, and the shorter the RTD the shorter CP required.

In certain aspects, a BS may be a ground or terrestrial based BS in a terrestrial network. In other aspects, a BS may be a non-terrestrial BS such as a satellite in a non-terrestrial network (NTN). A terrestrial BS communicating with a terrestrial UE is likely to have a relatively small RTD and/or frequency shift, while a non-terrestrial BS, such as a satellite, communicating with a terrestrial UE is likely to have a relatively large RTD and/or frequency shift.

For a relatively small RTD and/or frequency shift, a preamble with one sequence (e.g., Zadoff-Chu sequence) and a relatively small CP (e.g., in the order of microseconds) may suffice to estimate RTD and/or frequency shift. For relatively large RTD and/or frequency shift, a preamble with a relatively large CP (e.g., in the order of hundreds of ms) and potentially more than one sequence may be needed to estimate RTD and/or frequency shift.

In some cases, different types of UEs may communicate with a BS, such as a non-terrestrial BS. For example, a UE may be of a first type, in that it is capable of determining information about RTD and/or frequency shift with high accuracy between the UE and the BS prior to transmitting a preamble and receiving corresponding offset information from the BS. Alternatively, in an example, the UE may be of a second type, in that it is not capable of determining information about RTD and/or frequency shift between the UE and the BS prior to transmitting a preamble and receiving corresponding offset information from the BS.

For example, UEs of the first type may include UEs capable of estimating their distance from the BS and determining an initial estimate of RTD and/or frequency shift accordingly. In particular, such a UE may determine its own location and the location of the BS, and a distance between the locations. In certain aspects, the UE determines its own location by performing geo-positioning, such as using a satellite based positioning system (e.g., GPS, GLONASS, etc.). In certain aspects, the UE has a fixed location (i.e., it does not move relative to the earth) and is configured with its own location. In certain aspects the UE determines the BS's location through a transmission from the BS indicating its location, or through ephemeris.

In another example, UEs of the second type may include UEs that do not have information regarding their own location, such as UEs unable to perform geo-positioning, or unable to estimate their distance from the BS.

In certain cases, UEs of the first type, when transmitting the preamble to the BS, are able to adjust for RTD and/or frequency shift based on the initial estimate of RTD and/or frequency shift performed by the UE. Accordingly, even if the actual RTD and/or frequency shift between the UE and the BS is large, by adjusting transmission of the preamble in time and/or frequency based on the initial estimate of RTD and/or frequency shift, the difference between the time and/or frequency at which the preamble is received from the UE at the BS and the starting time and location of the RO in which the preamble is received may not be as large as when the UE (e.g., a UE of the second type) does not adjust transmission of the preamble. Thus, the BS only needs to estimate a residual RTD and/or frequency shift between the UE and the BS, the residual RTD and/or frequency shift being based on the difference between the actual RTD and/or frequency shift and the initial estimate of RTD and/or frequency shift performed by the UE.

Accordingly, for a non-terrestrial BS, such as a satellite, communicating with a terrestrial UE of the first type that adjusts for RTD and/or frequency shift, there is likely to be a relatively small residual RTD and/or frequency shift, requiring a relatively smaller CP for the preamble. For a non-terrestrial BS, such as a satellite, communicating with a terrestrial UE of the second type that does not adjust for RTD and/or frequency shift, there is likely to be a relatively large RTD and/or frequency shift, requiring a relatively larger CP for the preamble. In addition, the preamble for the second type UEs should also be able to support detection of larger frequency shifts.

Thus, for the same BS (e.g., communicating in the same or different coverage areas), UEs of one type, such as the second type, may need to transmit a preamble according to a preamble format having a longer CP and detectable with large frequency shifts in order for the BS to estimate RTD and/or frequency shift, while UEs of another type, such as the first type may be able to transmit a preamble according to a preamble format having a shorter CP while still enabling the BS to estimate RTD and/or frequency shift.

Accordingly, the following description provides techniques for enabling a single BS to use multiple RO types associated with different preamble formats (e.g., in the same and/or different coverage areas) that may help save on system resources (e.g., time and/or frequency resources) for communication between the BS and UEs. In particular, instead of all UEs using a single preamble format with a longer CP to send preambles to the BS because some of the UEs may have a larger RTD and/or frequency shift, some UEs having a smaller residual RTD and/or frequency shift can use a different preamble format with a shorter CP that advantageously uses less system resources and less transmit power. Thus, for example, some UEs can use a preamble format with a shorter CP in ROs of a first type, and some UEs can use a preamble format with a longer CP in ROs of a second type. Though certain aspects are described with respect to two RO types, two corresponding preamble formats, and two UE types, it should be noted that such aspects can similarly be applied to any multiple number of RO types, preamble formats, and/or UE types.

The following description provides examples of techniques for supporting multiple RO types for UEs to access BSs, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

NTNs may be wireless communications systems involving the use of satellites to provide coverage for terrestrial base stations and user equipment (UEs). One or more satellites may be included in an NTN. Some satellites in an NTN may operate as base stations, and UEs may communicate directly with a serving satellite. In other cases, base stations or other satellites may relay transmissions between a serving satellite and a UE.

Satellites may refer to vehicles operating in a variety of earth orbits, and in certain distances from the surface of the earth. For example, satellites may function in low-earth orbit (LEO), medium earth orbit (MEO) geostationary earth orbit (GEO), geosynchronous orbit (GSO), highly elliptical orbits (HEO), or another type of orbit. Each type of orbit may be defined for certain ranges of distances away from the surface of the earth. The distance between a UE and a serving satellite may be much greater than typical distances between a UE and a base station in a terrestrial network.

The distance between the satellite and the UE may lead to a RTD and a frequency shift that may negatively impact efficiency and communications functionality between the UE and the satellite as discussed. The frequency shift in the communications frequency between the satellite and the UE may be caused by the Doppler shift and by local oscillator error. For example, a satellite may be 600 kilometers (km) from the earth's surface. The satellite may have a small cell diameter of 100 km, and may observe a frequency shift of up to 125 kilohertz (kHz).

Further, as discussed, the RTD and frequency shift due to the long-distance aspects of an NTN in cases where the base station is an orbiting satellite may impede the transmission timing of random access process transmissions. This may impact and interfere with transmissions to and from the satellite and the UE for the random access process and of other messages transmitted after the UE is connected in the coverage area. Further, the frequency shift caused by the Doppler effect associated with an NTN may impact accurate message reception and may lead to inaccurately decoded messages and inefficient transmissions.

In some cases, the design of a preamble (e.g., an NR PRACH preamble) may not include an ability for the receiving base station or satellite to accommodate a large (differential) RTD or large frequency shift due to the Doppler effect, and may also not include an ability to estimate RTD or frequency shift. For example, these preambles may support up to 684 microsecond (μs) RTD and up to 10 kilohertz (kHz) frequency shift within a cell. These limits may be much smaller than differential RTD and frequency shift for an NTN.

These preambles may include a Zadoff-Chu (ZC) root plus a cyclic shift. With this preamble design, in order to be able to identify RTD and the frequency shift (e.g., due to the Doppler effect), the cyclic shift would need to be large enough to encompass the shift caused by both the RTD and the frequency shift. This may also assume that RTD is less than the cyclic shift and the frequency shift is less than 1 or 2 times the sub-carrier spacing (SCS). The RTD and frequency shift associated with an NTN may not meet these requirements of the cyclic shift and preamble for some types of preambles, such as in NR systems.

In cases where the RTD and the frequency shift are large due to the transmission distances in an NTN, a UE may instead generate a preamble that uses ZC sequences and orthogonal frequency division multiplexing (OFDM) modulation, but does not utilize a cyclic shift. These multi-root preambles may support communications in networks with larger frequency shifts and longer RTDs. For example, some preambles may support a frequency shift range of ±500 kHz, and an RTD range of up to the minimum of the cyclic prefix (CP) and guard time (GT) (e.g., min (CP, GT)).

Aspects of the disclosure are initially described in the context of wireless communications systems.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs)

110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x.

The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) and satellites 140 in the wireless communication network 100. The UEs 120 (e.g., 120x, 120y, etc.) may be dispersed throughout the wireless communication network 100, and each UE 120 may be stationary (e.g., fixed) or mobile.

Satellite 140 may communicate with BSs 110 (e.g., BS 110a) and UE 120 (e.g., UE 120a). Satellite 140 may be any suitable type of communication satellite configured to relay communications between different end nodes in a wireless communication network. Satellite 140 may be an example of a space satellite, a balloon, a dirigible, an airplane, a drone, an unmanned aerial vehicle, and/or the like. In some examples, the satellite 140 may be in a geosynchronous or geostationary earth orbit, a low earth orbit or a medium earth orbit. Satellite 140 may be a multi-beam satellite configured to provide service for multiple service beam coverage areas in a predefined geographical service area. The satellite 140 may be any distance away from the surface of the earth.

In some cases, a cell 102 may be provided or established by a satellite 140 as part of a non-terrestrial network. Satellite 140 may, in some cases, perform the functions of a BS 110, act as a bent-pipe satellite, or may act as a regenerative satellite, or a combination thereof. In other cases, satellite 140 may be an example of a smart satellite, or a satellite with intelligence. For example, a smart satellite may be configured to perform more functions than a regenerative satellite (e.g., may be configured to perform particular algorithms beyond those used in regenerative satellites, to be reprogrammed, etc.). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., satellite 140) may receive a signal from a BS 110 and may relay the signal to a UE 120 or another BS 110, or vice-versa.

UE 120 may communicate with satellites 140 using wireless communications links. Satellite 140 may transmit control signaling to BSs 110 and UEs 120 in the form of a system information block (SIB). The SIB may include system information that the UE 120 may utilize for a random access process. The UE 120 may utilize a random access process, including a preamble transmission, to obtain communication access with the satellite 140. The satellite 140 may orbit earth, and communications between a UE 120 and a satellite 140 may be associated with a long RTD and a frequency shift.

According to certain aspects, the UEs 120, BSs 110, and satellite 140 may be configured for supporting multiple types of ROs associated with multiple types of preamble formats. As shown in FIG. 1, the BS 110a includes a random access manager 124b. The random access manager 124b may be configured to support multiple types of ROs in one or more cells of the BS 110a, in accordance with aspects of the present disclosure. In certain aspects a BS such as BS 110a may be referred to as a terrestrial BS.

As shown in FIG. 1, the satellite 140 includes a random access manager 124a. The random access manager 124a may be configured to support multiple types of ROs in one or more cells and/or beams of the satellite 140, in accordance with aspects of the present disclosure. In certain aspects, a satellite, such as satellite 140 may be referred to as a BS, or more specifically as a non-terrestrial BS.

As shown in FIG. 1, the UE 120a includes a random access manager 124c. The random access manager 124c may be configured to support multiple types of ROs in one or more cells and/or beams of the BS 110a and/or satellite 140, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
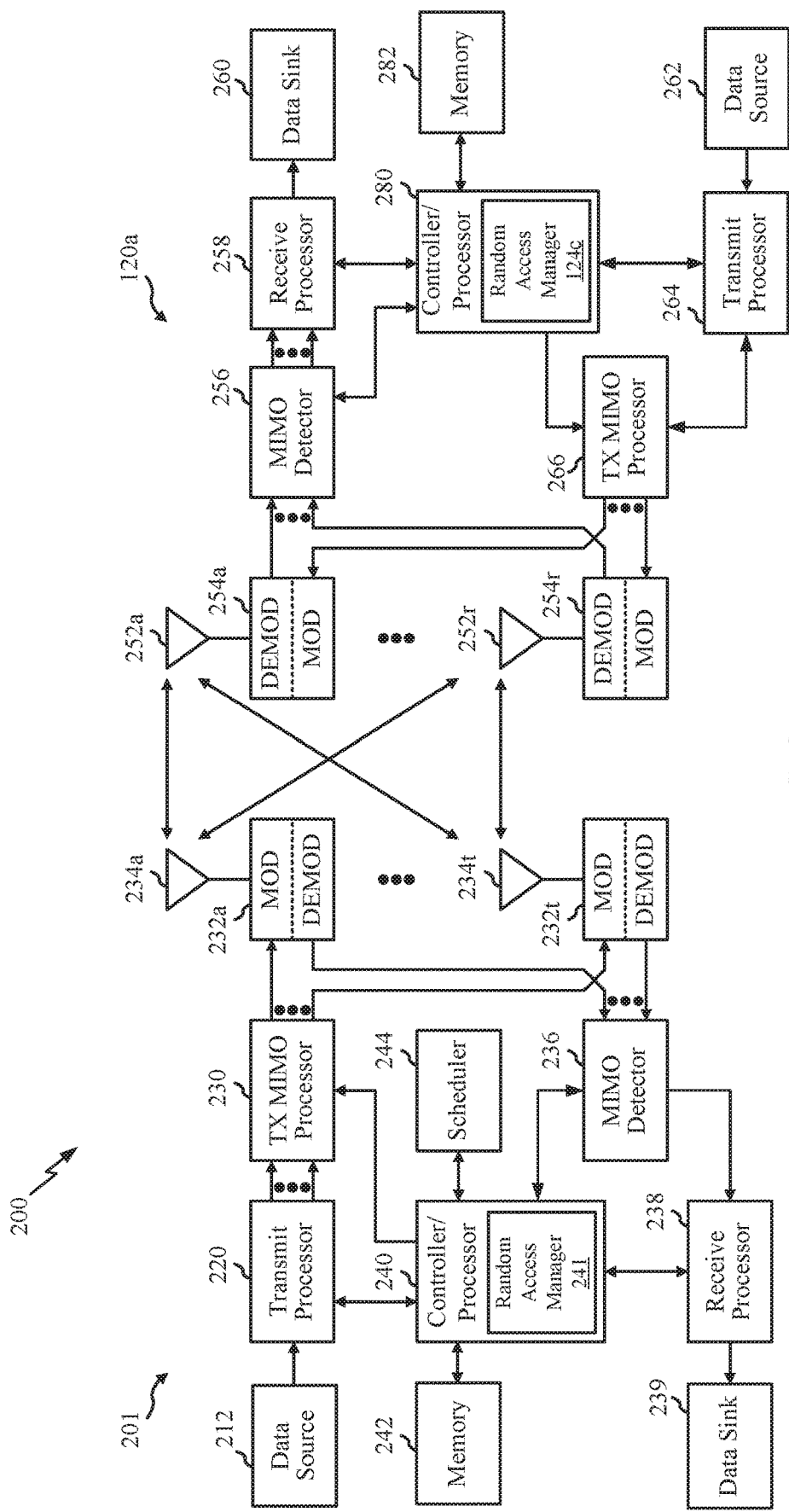
FIG. 2 is a block diagram conceptually illustrating a design of an example a base station (BS) and user equipment (UE), in accordance with certain aspects of the present disclosure.

FIG. 2 illustrates example components 200 of a BS 201 (e.g., the BS 110a or satellite 140 in the wireless communication network 100 of FIG. 1) and UE 120a (e.g., in the wireless communication network 100 of FIG. 1), which may be used to implement aspects of the present disclosure.

At the BS 201, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 201 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 201. At the BS 201, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 201 and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. As shown in FIG. 2, the controller/processor 280 of the UE 120a has a random access manager 124c that may be configured to support multiple types of ROs in one or more cells and/or beams of the BS 201, in accordance with aspects of the present disclosure. Further, as shown in FIG. 2, the controller/processor 240 of the BS 201 has a random access manager 241 (e.g., corresponding to random access manager 124a or 124b) that may be configured to support multiple types of ROs in one or more cells and/or beams of the BS 201, in accordance with aspects of the present disclosure.

Figure 3:
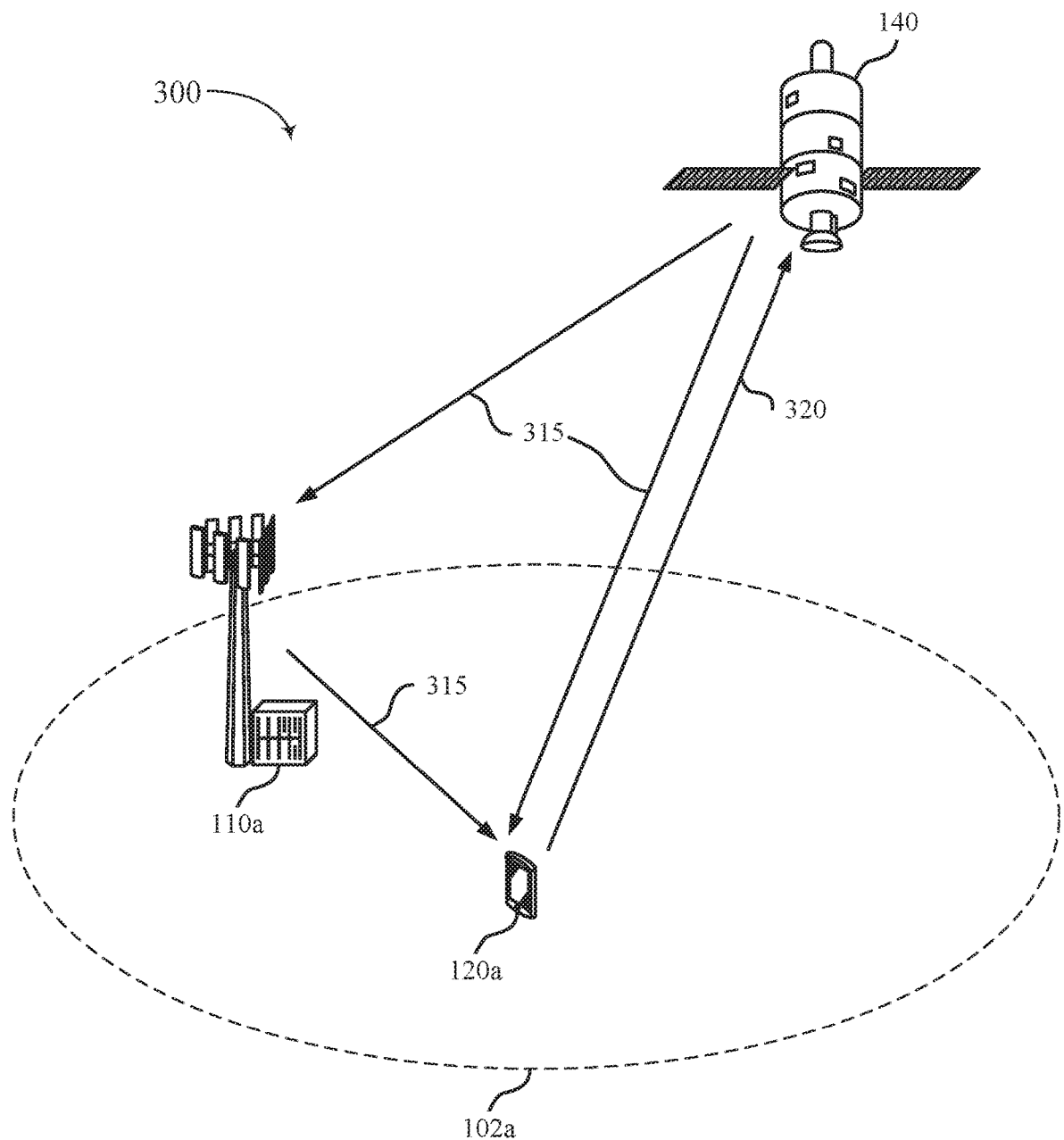
FIG. 3 is a diagram illustrating an example of a wireless communications system that supports multiple types of random access occasions (ROs), in accordance with certain aspects of the present disclosure.

FIG. 3 illustrates an example of a wireless communications system 300 that supports multiple types of ROs in accordance with aspects of the present disclosure. In some examples, wireless communications system 300 may implement aspects of wireless communication network 100. For example, wireless communications system 300 may include BS 110a, UE 120a, and satellite 140, which may be examples of BS 110, UE 120, and satellite 140 as described with reference to FIG. 1. Base station 110a may serve coverage area or cell 102a in cases of a terrestrial network, and satellite 140 may serve coverage area 102a in cases of an NTN.

Satellite 140 may communicate with BS 110a and UE 120a as part of wireless communications in an NTN. In cases of a terrestrial network, UE 120a may communicate with BS 110a over a communication link. In the case of NTN wireless communications, satellite 140 may be the serving BS for UE 120a. In certain aspects, the BS 110a may act as a relay for the satellite 140, relaying control signaling 315 from the satellite 140 to the UE 120a.

Satellite 140 may orbit the earth's surface at a particular altitude. The distance between satellite 140 and UE 120a may be much greater than the distance between BS 110a and UE 120a. The distance between UE 120a and satellite 140 may cause an increased RTD in communications between UE 120a and satellite 140. The distance may also cause a frequency shift in communications between UE 120a and satellite 140. The frequency shift may be caused by the Doppler effect and error related to the local oscillation of either UE 120a or satellite 140. The RTD and frequency shift associated with communications in NTNs may lead to inefficiency in transmissions, latency, and inability to accurately transmit and receive messages.

UE 120a may determine to connect to satellite 140 using a random access procedure (e.g., a four-step RACH). The initiation of the RACH procedure may begin with the transmission of a random access preamble (e.g., NR PRACH) by UE 120a to satellite 140 or base station 110a. UE 120a may transmit the random access preamble in a RO of one of multiple RO types, according to aspects discussed herein.

Example Techniques for Supporting Multiple Types of ROS

As discussed, this disclosure provides techniques for enabling a single BS, such as BS 201, to use multiple RO types associated with different preamble formats (e.g., in the same and/or different coverage areas) that may help save on system resources (e.g., time and/or frequency resources) for communication between the BS 201 and UEs, such as UEs 120.

For example, the BS 201 may broadcast system information to the UEs 120 corresponding to one or more coverage areas of BS 201, as discussed. The system information may indicate a plurality of RO types. Some or all of the plurality of RO types may indicate the same starting time and starting frequency. Some or all of the plurality of RO types may indicate different starting times and/or starting frequencies. Some or all of the plurality of RO types may indicate the same periodicity. Some or all of the plurality of RO types may indicate different periodicities.

The system information may further indicate multiple preamble formats, and indicate which RO types the preamble formats are associated with. For example, the system information may indicate, for each preamble format, an associated RO type. In certain aspects, each RO type is associated with a different preamble format. In some aspects, a single RO type can be associated with multiple preamble formats.

As discussed, the parameters of each RO type and associated preamble format define the time and frequency resources of the ROs of each RO type.

Figure 4A:
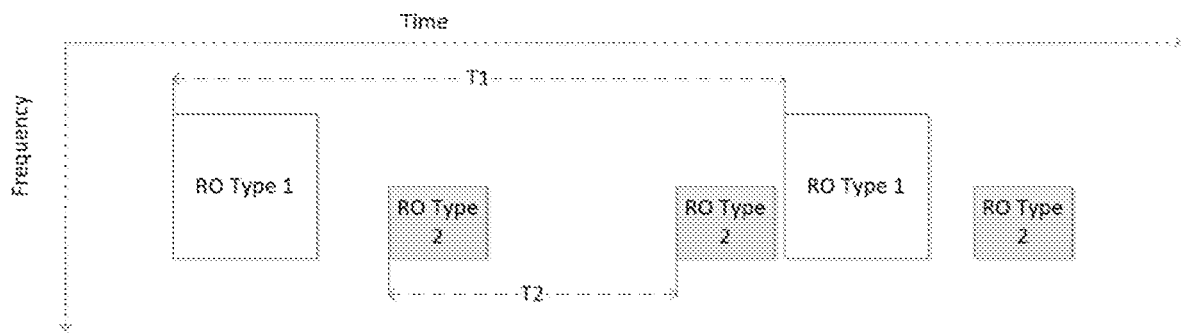
FIGS. 4A and 4B illustrate examples of ROs of two different RO types, RO Type 1 and RO Type 2, in accordance with certain aspects of the present disclosure.

In certain aspects, ROs of different RO types do not overlap. For example, FIG. 4A illustrates an example of ROs of two different RO types, RO Type 1 and RO Type 2, that do not overlap in both time and frequency. As shown, ROs of RO Type 1 have a periodicity of T1, and ROs of RO Type 2 have a periodicity of T2 that is different than T1. Further, the starting time of RO Type 1 is different than the starting time of RO Type 2. However, in this example, the starting frequency of RO Type 1 is the same as the starting frequency of RO Type 2.

Further, RO Type 1 is associated with a first preamble format and RO Type 2 is associated with a second preamble format. As shown, the length (i.e., duration) in time and width in frequency of RO Type 2 based on the second preamble format is less than the length in time and width in frequency of RO Type 1 based on the first preamble format. This may be because the first preamble format associated with RO Type 1 is configured to accommodate for relatively larger RTD and/or frequency shift than the second preamble format associated with RO Type 2. For example, the first preamble format may be associated with a relatively larger CP and the second preamble format may be associated with a relatively smaller CP. Accordingly, the first preamble format may be associated with a relatively longer time duration preamble, and the second preamble format may be associated with a relatively shorter time duration preamble.

Figure 4B:
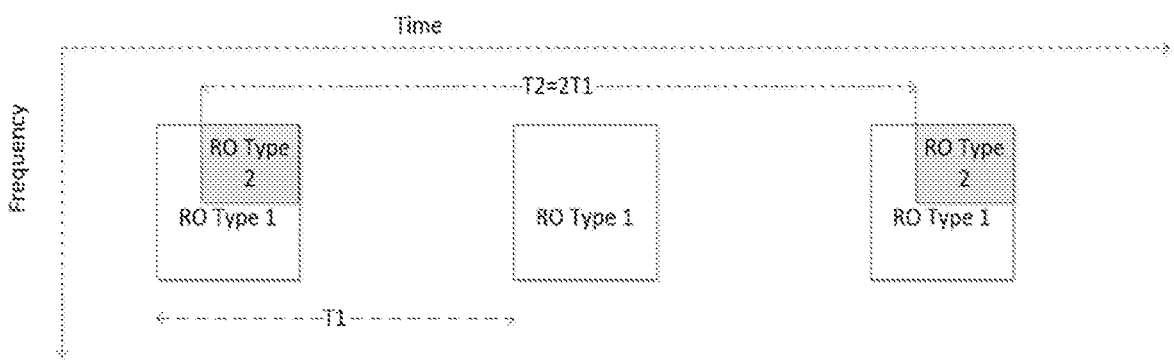

In certain aspects, ROs of different RO types at least partially overlap in both time and frequency. For example, FIG. 4B illustrates an example of ROs of two different RO types, RO Type 1 and RO Type 2, that overlap. In this example, RO Type 1 is associated with a first preamble format and RO Type 2 is associated with a second preamble format. The first and second preamble formats may have the same characteristics as discussed with respect to FIG. 4A.

However, in FIG. 4B, the periodicities of RO Type 1 and RO Type 2, as well as the starting frequencies and starting times are such that the ROs of RO Type 1 and RO Type 2 overlap. As shown, even though the periodicities, starting frequencies, and starting times of RO Type 1 and RO Type 2 are different, the ROs of RO Type 1 and RO Type 2 still overlap.

In certain aspects, where ROs of different RO types at least partially overlap in both time and frequency, the first RO type is associated with a first preamble format, the second RO type is associated with a second preamble format, the first preamble format and the second preamble format use Zadoff-Chu sequences, have a same sequence length, and a same subcarrier spacing, the first preamble format has a first cyclic prefix length and the second preamble format has a second cyclic prefix length that is shorter than the first cyclic prefix length, ROs of the second RO type are fully contained in ROs of the first RO type, and the first preamble format uses a first set of roots for a corresponding Zadoff-Chu sequence and the second preamble format uses a second set of roots for a corresponding Zadoff-Chu sequence. By using different or disjoint sets of roots for the first preamble format and the second preamble format in such a manner, the RO of the format with the shorter CP can be fully contained in the RO of the format with the longer CP, but the preambles in each can still be differentiable.

One or more of the UEs 120 may receive the system information from the BS 201 and determine to perform a random access process as discussed. Accordingly, the UEs 120 receive an indication of multiple preamble formats, an indication of multiple RO types, and information associating or mapping a preamble format to each RO type.

The UEs 120 may further be configured with (e.g., at time of manufacture, via an over the air update, via a broadcast from BS 201, via system information, etc.) a mapping between preamble formats and UE types. For example, a first UE type, as discussed, corresponding to a UE that is capable of determining information about RTD and/or frequency shift between the UE and a BS prior to transmitting a preamble and receiving corresponding offset information from the BS, may be mapped to one or more preamble formats. In certain aspects, for the first UE type, the one or more preamble formats include preamble formats suited for estimating a relatively smaller RTD and/or frequency shift, as discussed, such as by having a relatively shorter CP.

Further, a second UE type, as discussed, corresponding to a UE that is not capable of determining information about RTD and/or frequency shift between the UE and a BS prior to transmitting a preamble and receiving corresponding offset information from the B S, may be mapped to one or more preamble formats. In certain aspects, for the second UE type, the one or more preamble formats include preamble formats suited for estimating a relatively larger RTD and/or frequency shift, as discussed, such as by having a relatively longer CP.

In certain aspects, a UE 120, based on the mapping, determines which preamble format(s) are associated with its UE type. Accordingly, when the UE 120 receives from the BS 201 an indication of multiple preamble formats that can be used to perform a random access process with the BS 201, the UE 120 selects a preamble format of the multiple preamble formats that is also associated with its UE type based on the mapping. If more than one of the multiple preamble formats is associated with the UE type of the UE 120, the UE may randomly select one such preamble format, select the one of the more than one of the multiple preamble formats that is shortest in time and/or frequency, etc.

Based on the selected preamble format, the UE 120 determines the RO type associated with the preamble format. The UE 120 can then transmit a preamble in a RO of the determined RO type according to the selected preamble format for a random access process. Thus, based on the techniques described herein, UEs of different types can transmits preambles of different preamble formats as part of a random access process. As discussed, this may help to save on use of system resources in the network by allowing some UEs to use shorter preambles that use less resources while still allowing other UEs to use longer preambles when needed.

Figure 5:
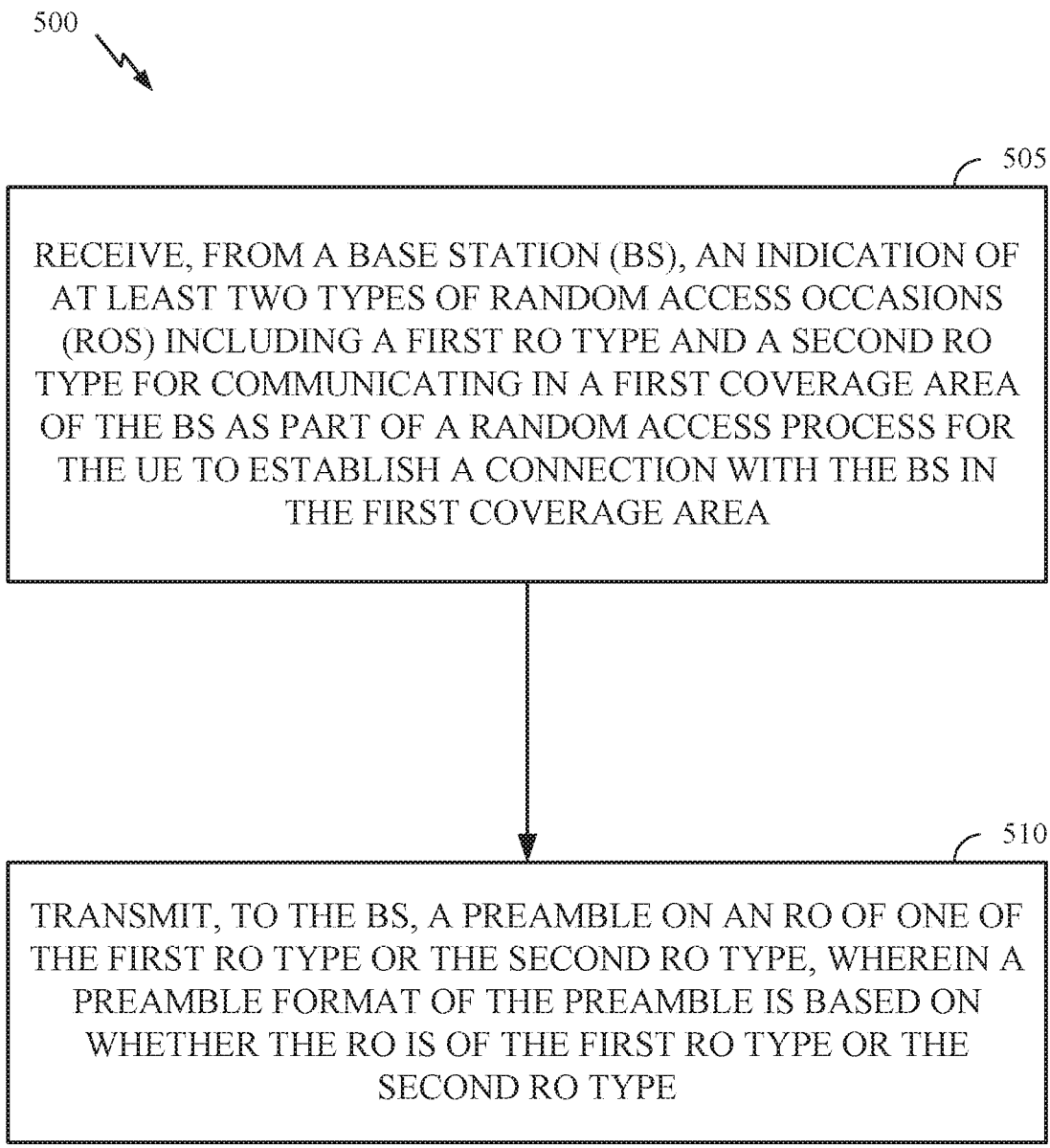
FIG. 5 is flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. The operations 500 may be performed, for example, by a UE (e.g., such as a UE 120 in the wireless communication network 100). The operations 500 may be complimentary operations by the UE to the operations 600 performed by the BS. Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 505, by receiving, from a base station (BS), an indication of at least two types of random access occasions (ROs) including a first RO type and a second RO type for communicating in a first coverage area of the BS as part of a random access process for the UE to establish a connection with the BS in the first coverage area. The operations 500 may proceed to block 510, by transmitting, to the BS, a preamble on an RO of one of the first RO type or the second RO type, wherein a preamble format of the preamble is based on whether the RO is of the first RO type or the second RO type.

In certain aspects of operations 500, the first RO type corresponds to a first duration in time, a first frequency range, and a first periodicity; and the second RO type corresponds to a second duration in time, a second frequency range, and a second periodicity.

In certain aspects of operations 500, ROs of the first RO type and ROs of the second RO type do not overlap in both frequency and time.

In certain aspects of operations 500, ROs of the first RO type and ROs of the second RO type at least partially overlap in both frequency and time.

In certain aspects of operations 500, the first coverage area comprises one of a cell of the BS or a beam of a satellite corresponding to the BS.

In certain aspects of operations 500, the first RO type is associated with a first preamble format indicating a first time duration for the preamble, and the second RO type is associated with a second preamble format indicating a second time duration for the preamble that is different than the first time duration.

In certain aspects of operations 500, operations 500 further include determining to transmit the preamble using the one of the first RO type or the second RO type based on a type of the UE. In certain such aspects, determining to transmit the preamble using the one of the first RO type or the second RO type based on the type of the UE comprises: determining the preamble format based on the type of the UE and a mapping between preamble formats and types of UEs; and determining the one of the first RO type or the second RO type is associated with the determined preamble format. In certain such aspects, operations 500 further include receiving the mapping from the BS.

In certain aspects, the type of the UE indicates whether the UE is capable of determining information regarding one or more of a round-trip delay or a frequency shift for communication between the UE and the BS prior to transmitting the preamble.

In certain aspects, the type of the UE indicates whether the UE has information regarding a location of the UE and a location of the BS.

In certain aspects, the type of the UE indicates whether the UE supports a satellite based positioning system.

In certain aspects of operations 500, the first RO type is associated with a first preamble format, the second RO type is associated with a second preamble format, the first preamble format and the second preamble format use Zadoff-Chu sequences, have a same sequence length, and a same subcarrier spacing, the first preamble format has a first cyclic prefix length and the second preamble format has a second cyclic prefix length that is shorter than the first cyclic prefix length, ROs of the second RO type are fully contained in ROs of the first RO type, and the first preamble format uses a first set of roots for a corresponding Zadoff-Chu sequence and the second preamble format uses a second set of roots for a corresponding Zadoff-Chu sequence.

Figure 6:
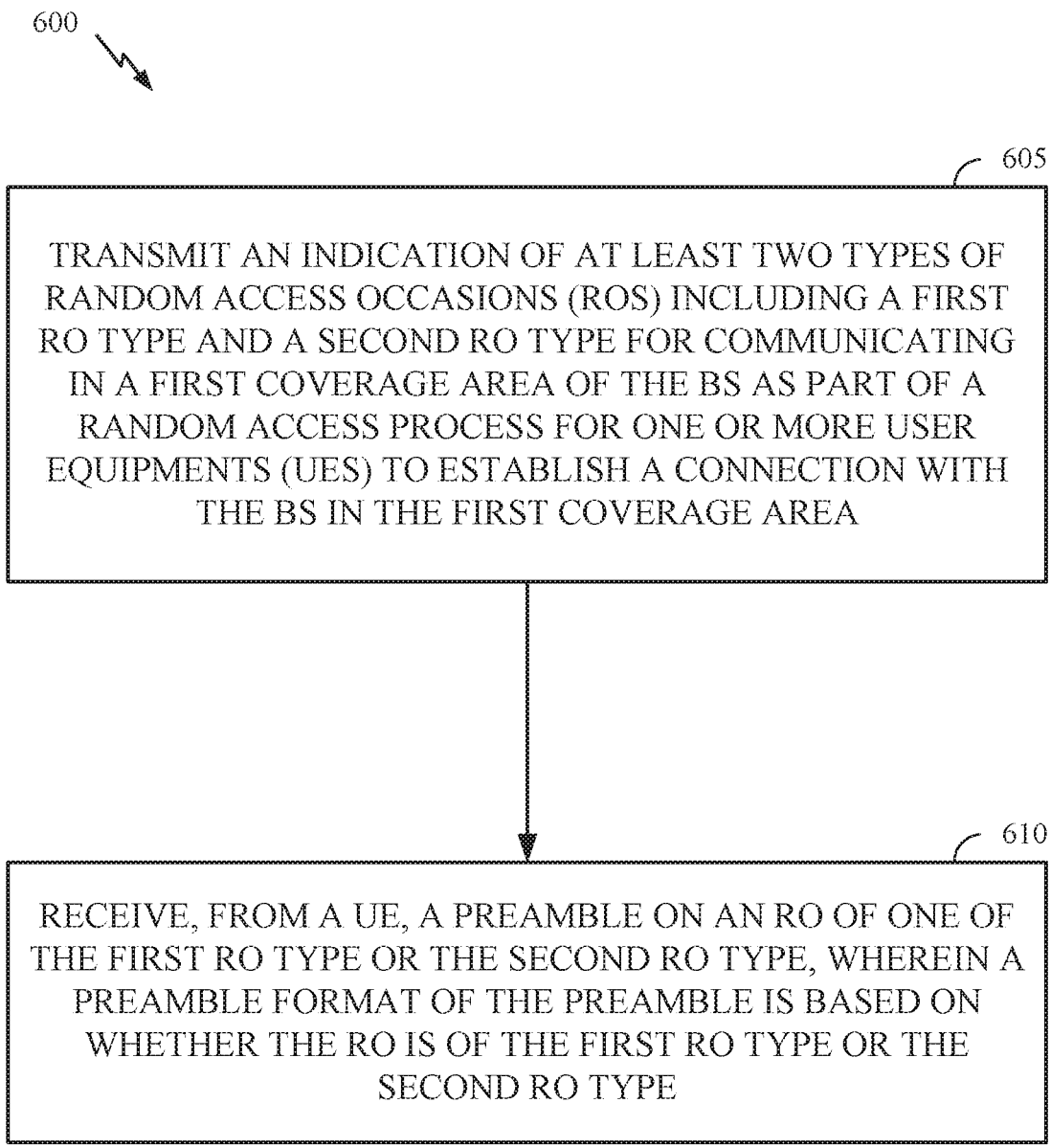
FIG. 6 is flow diagram illustrating example operations for wireless communication by a BS, in accordance with certain aspects of the present disclosure.

FIG. 6 is a flow diagram illustrating example operations 600 for wireless communication, in accordance with certain aspects of the present disclosure. The operations 600 may be performed, for example, by a BS (e.g., such as the BS 110*a*, BS 201, or satellite 140 in the wireless communication network 100). Operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 may begin, at block 605, by transmitting an indication of at least two types of random access occasions (ROs) including a first RO type and a second RO type for communicating in a first coverage area of the BS as part of a random access process for one or more user equipments (UEs) to establish a connection with the BS in the first coverage area.

The operations 600 may proceed to block 610, by receiving, from a UE, a preamble on an RO of one of the first RO type or the second RO type, wherein a preamble format of the preamble is based on whether the RO is of the first RO type or the second RO type.

In certain aspects of operations 600, the first RO type corresponds to a first duration in time, a first frequency range, and a first periodicity; and the second RO type corresponds to a second duration in time, a second frequency range, and a second periodicity.

In certain aspects of operations 600, ROs of the first RO type and ROs of the second RO type do not overlap in both frequency and time.

In certain aspects of operations 600, ROs of the first RO type and ROs of the second RO type at least partially overlap in both frequency and time.

In certain aspects of operations 600, the first coverage area comprises one of a cell of the BS or a beam of a satellite corresponding to the BS.

In certain aspects of operations 600, the first RO type is associated with a first preamble format indicating a first time duration for the preamble, and the second RO type is associated with a second preamble format indicating a second time duration for the preamble that is different than the first time duration.

In certain aspects of operations 600, the preamble format is further based on a type of the UE.

In certain aspects of operations 600, operations 600 further include transmitting a mapping between preamble formats and types of UEs to the UE.

In certain aspects, the type of the UE indicates whether the UE is capable of determining information regarding one or more of a round-trip delay or a frequency shift for communication between the UE and the BS prior to transmitting the preamble.

In certain aspects, the type of the UE indicates whether the UE has information regarding a location of the UE and a location of the BS.

In certain aspects, the type of the UE indicates whether the UE supports a satellite based positioning system.

In certain aspects of operations 600, the first RO type is associated with a first preamble format, the second RO type is associated with a second preamble format, the first preamble format and the second preamble format use Zadoff-Chu sequences, have a same sequence length, and a same subcarrier spacing, the first preamble format has a first cyclic prefix length and the second preamble format has a second cyclic prefix length that is shorter than the first cyclic prefix length, ROs of the second RO type are fully contained in ROs of the first RO type, and the first preamble format uses a first set of roots for a corresponding Zadoff-Chu sequence and the second preamble format uses a second set of roots for a corresponding Zadoff-Chu sequence.

Figure 7:
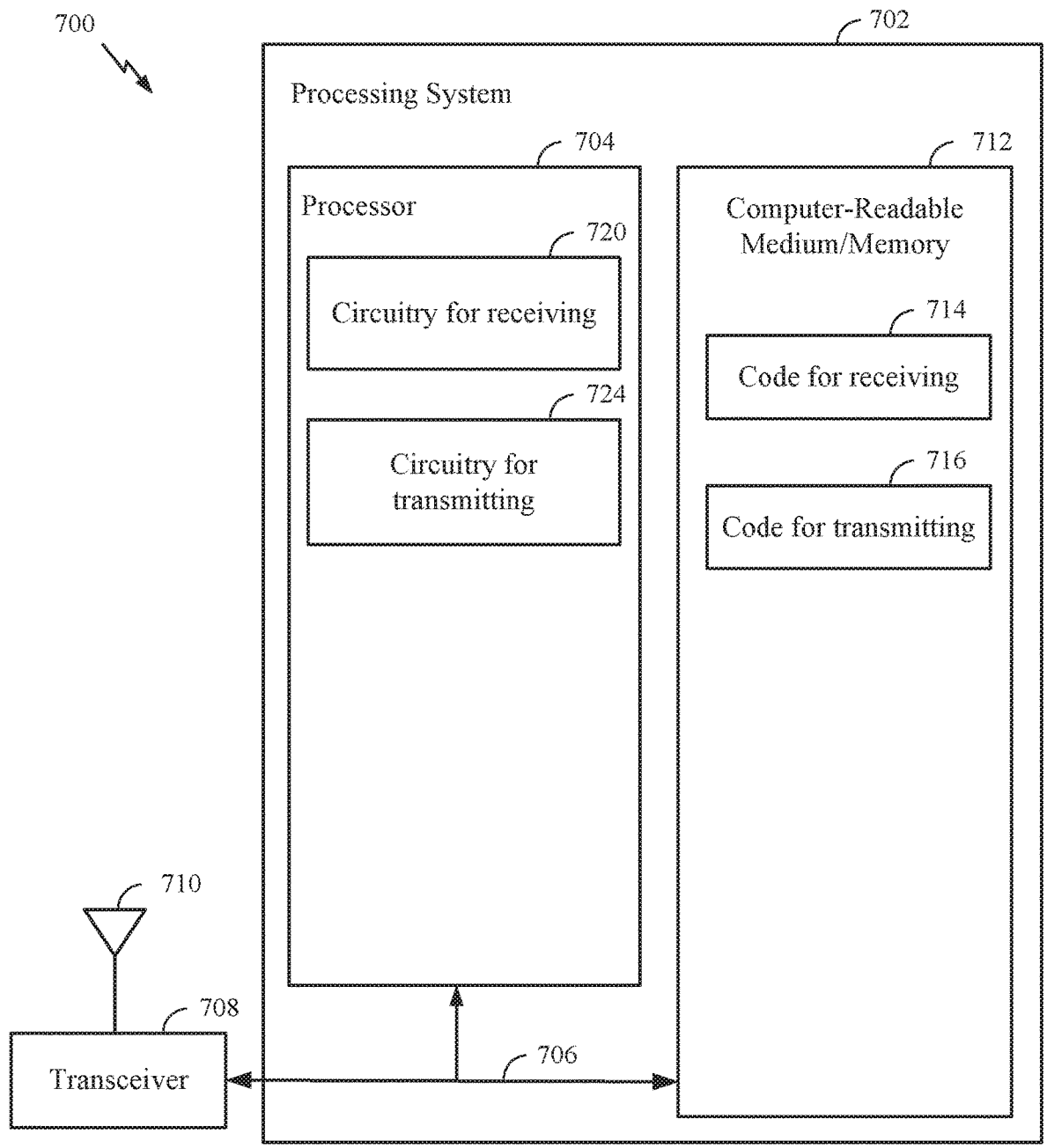
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 5. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 5, or other operations for performing the various techniques discussed herein for supporting multiple RO types. In certain aspects, computer-readable medium/memory 712 stores code 714 for receiving an indication of at least two types of ROs and code 716 for transmitting a preamble on an RO. In certain aspects, the processor 704 has circuitry configured to implement the code stored in the computer-readable medium/memory 712. The processor 704 includes circuitry 720 for receiving an indication of at least two types of ROs and circuitry 724 for transmitting a preamble on an RO.

Figure 8:
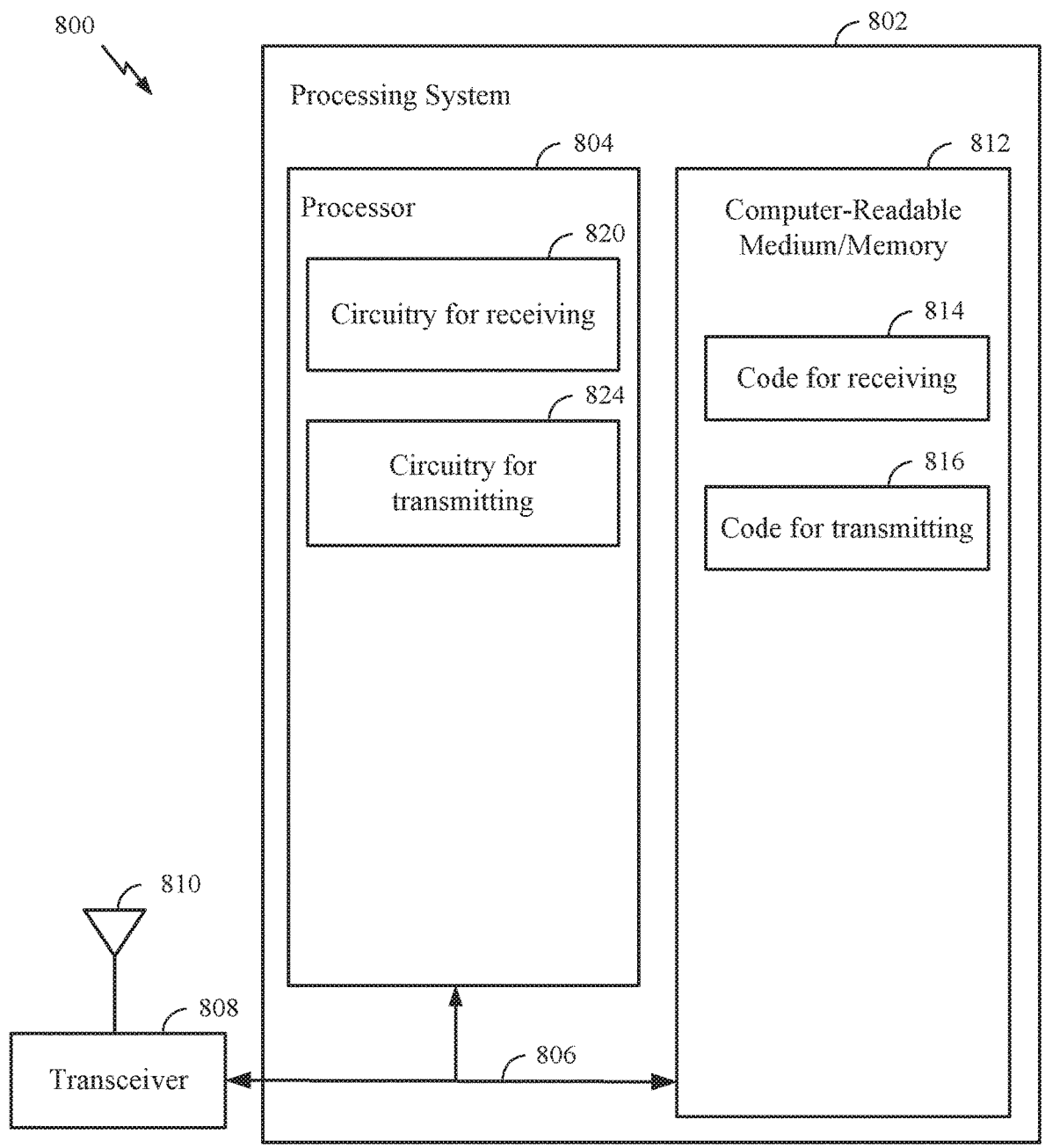
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 6. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 6, or other operations for performing the various techniques discussed herein for supporting multiple RO types. In certain aspects, computer-readable medium/memory 812 stores code 814 for transmitting an indication of at least two types of ROs and code 816 receiving a preamble on an RO. In certain aspects, the processor 804 has circuitry configured to implement the code stored in the computer-readable medium/memory 812. The processor 804 includes circuitry 820 for transmitting an indication of at least two types of ROs and circuitry 824 for receiving a preamble on an RO.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5 and/or 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication at a user equipment (UE), comprising:
   receiving, from a network entity, an indication of at least two types of random access occasions (ROs) including a first RO type and a second RO type for communicating in a first coverage area of the network entity as part of a random access process for the UE to establish a connection with the network entity in the first coverage area;
   determining to transmit a preamble using the one of the first RO type or the second RO type based on a type of the UE, wherein the type of the UE indicates:
      whether the UE is capable of determining information regarding one or more of a round-trip delay or a frequency shift for communication between the UE and the BS prior to transmitting the preamble; or
      whether the UE has information regarding a location of the UE and a location of the BS; or
      whether the UE supports a satellite based positioning system; and
   transmitting, to the network entity, a preamble on an RO of one of the first RO type or the second RO type based on the determining, wherein a preamble format of the preamble is based on whether the RO is of the first RO type or the second RO type.

2. The method of claim 1, wherein the first RO type corresponds to a first duration in time, a first frequency range, and a first periodicity; and wherein the second RO type corresponds to a second duration in time, a second frequency range, and a second periodicity.

3. The method of claim 1, wherein ROs of the first RO type and ROs of the second RO type do not overlap in both frequency and time.

4. The method of claim 1, wherein ROs of the first RO type and ROs of the second RO type at least partially overlap in both frequency and time.

5. The method of claim 1, wherein the first coverage area comprises one of a cell of the network entity or a beam of a satellite corresponding to the network entity.

6. The method of claim 1, wherein the first RO type is associated with a first preamble format indicating a first time duration for the preamble, and wherein the second RO type is associated with a second preamble format indicating a second time duration for the preamble that is different than the first time duration.

7. The method of claim 1, wherein determining to transmit the preamble using the one of the first RO type or the second RO type based on the type of the UE comprises:
   determining the preamble format based on the type of the UE and a mapping between preamble formats and types of UEs; and
   determining the one of the first RO type or the second RO type is associated with the determined preamble format.

8. The method of claim 7, further comprising receiving the mapping from the network entity.

9. The method of claim 1, wherein:
   the first RO type is associated with a first preamble format,
   the second RO type is associated with a second preamble format,
   the first preamble format and the second preamble format use Zadoff-Chu sequences, have a same sequence length, and a same subcarrier spacing,
   the first preamble format has a first cyclic prefix length and the second preamble format has a second cyclic prefix length that is shorter than the first cyclic prefix length,
   ROs of the second RO type are fully contained in ROs of the first RO type, and
   the first preamble format uses a first set of roots for a corresponding Zadoff-Chu sequence and the second preamble format uses a second set of roots for a corresponding Zadoff-Chu sequence.

10. A method of wireless communication at a network entity, comprising:
    transmitting an indication of at least two types of random access occasions (ROs) including a first RO type and a second RO type for communicating in a first coverage area of the network entity as part of a random access process for one or more user equipments (UEs) to establish a connection with the network entity in the first coverage area; and
    receiving, from a UE, a preamble on an RO of one of the first RO type or the second RO type, wherein a preamble format of the preamble is based on whether the RO is of the first RO type or the second RO type and the preamble format is further based on a type of the UE, and wherein the type of the UE indicates:
       whether the UE is capable of determining information regarding one or more of a round-trip delay or a frequency shift for communication between the UE and the BS prior to transmitting the preamble; or
       whether the UE has information regarding a location of the UE and a location of the BS; or
       whether the UE supports a satellite based positioning system.

11. The method of claim 10, wherein the first RO type corresponds to a first duration in time, a first frequency range, and a first periodicity; and wherein the second RO type corresponds to a second duration in time, a second frequency range, and a second periodicity.

12. The method of claim 10, wherein ROs of the first RO type and ROs of the second RO type do not overlap in both frequency and time.

13. The method of claim 10, wherein ROs of the first RO type and ROs of the second RO type at least partially overlap in both frequency and time.

14. The method of claim 10, wherein the first coverage area comprises one of a cell of the network entity or a beam of a satellite corresponding to the network entity.

15. The method of claim 10, wherein the first RO type is associated with a first preamble format indicating a first time duration for the preamble, and wherein the second RO type is associated with a second preamble format indicating a second time duration for the preamble that is different than the first time duration.

16. The method of claim 10, further comprising transmitting a mapping between preamble formats and types of UEs to the UE.

17. The method of claim 10, wherein:
the first RO type is associated with a first preamble format,
the second RO type is associated with a second preamble format,
the first preamble format and the second preamble format use Zadoff-Chu sequences, have a same sequence length, and a same subcarrier spacing,
the first preamble format has a first cyclic prefix length and the second preamble format has a second cyclic prefix length that is shorter than the first cyclic prefix length,
ROs of the second RO type are fully contained in ROs of the first RO type, and
the first preamble format uses a first set of roots for a corresponding Zadoff-Chu sequence and the second preamble format uses a second set of roots for a corresponding Zadoff-Chu sequence.

18. A user equipment (UE) configured for wireless communications, comprising: a memory comprising computer-executable instructions; and a processor configured to execute the computer-executable instructions and cause the UE to:
receive, from a network entity, an indication of at least two types of random access occasions (ROs) including a first RO type and a second RO type for communicating in a first coverage area of the network entity as part of a random access process for the UE to establish a connection with the network entity in the first coverage area;
determining to transmit a preamble using the one of the first RO type or the second RO type based on a type of the UE, wherein the type of the UE indicates:
whether the UE is capable of determining information regarding one or more of a round-trip delay or a frequency shift for communication between the UE and the BS prior to transmitting the preamble; or
whether the UE has information regarding a location of the UE and a location of the BS; or
whether the UE supports a satellite based positioning system; and
transmit, to the network entity, a preamble on an RO of one of the first RO type or the second RO type based on the determining, wherein a preamble format of the preamble is based on whether the RO is of the first RO type or the second RO type.

19. The UE of claim 18, wherein the first RO type corresponds to a first duration in time, a first frequency range, and a first periodicity; and wherein the second RO type corresponds to a second duration in time, a second frequency range, and a second periodicity.

20. The UE of claim 18, wherein ROs of the first RO type and ROs of the second RO type do not overlap in both frequency and time.

21. A network entity configured for wireless communications, comprising: a memory comprising computer-executable instructions; and a processor configured to execute the computer-executable instructions and cause the network entity to:
transmit an indication of at least two types of random access occasions (ROs) including a first RO type and a second RO type for communicating in a first coverage area of the network entity as part of a random access process for one or more user equipments (UEs) to establish a connection with the network entity in the first coverage area; and
receive, from a UE, a preamble on an RO of one of the first RO type or the second RO type, wherein a preamble format of the preamble is based on whether the RO is of the first RO type or the second RO type and the preamble format is further based on a type of the UE, and wherein the type of the UE indicates:
whether the UE is capable of determining information regarding one or more of a round-trip delay or a frequency shift for communication between the UE and the BS prior to transmitting the preamble; or
whether the UE has information regarding a location of the UE and a location of the BS; or
whether the UE supports a satellite based positioning system.

22. The network entity of claim 21, wherein the first RO type corresponds to a first duration in time, a first frequency range, and a first periodicity; and wherein the second RO type corresponds to a second duration in time, a second frequency range, and a second periodicity.

* * * * *